United States Patent [19]

Roodvoets

[11] Patent Number: 4,559,263
[45] Date of Patent: Dec. 17, 1985

[54] CEMENT-FOAM COMPOSITE BOARD

[75] Inventor: David L. Roodvoets, Westville, Ohio

[73] Assignee: The Dow Chemical Company, Midland, Mich.

[21] Appl. No.: 700,844

[22] Filed: Feb. 11, 1985

[51] Int. Cl.[4] .......................... B32B 5/18; B32B 5/32; B32B 13/12

[52] U.S. Cl. ................ 428/312.4; 428/314.4; 428/316.6; 428/317.7; 428/318.4; 428/703

[58] Field of Search .............. 428/304.4, 312.4, 314.4, 428/314.8, 316.6, 317.1, 317.7, 318.4, 703

[56] References Cited

U.S. PATENT DOCUMENTS

| | | | |
|---|---|---|---|
| 3,483,664 | 12/1969 | Funk et al. | 428/319.7 |
| 3,592,724 | 7/1971 | King, Jr. | 428/312.4 |
| 3,892,899 | 7/1975 | Klein | 428/314.4 |
| 3,963,849 | 6/1976 | Thompson | 428/312.4 |
| 4,349,398 | 9/1982 | Kearns et al. | 428/317.7 |
| 4,357,384 | 11/1982 | Jasperson | 428/318.4 |

FOREIGN PATENT DOCUMENTS 2512191 10/1976 Fed. Rep. of Germany ... 428/312.4

Primary Examiner—William J. Van Balen
Attorney, Agent, or Firm—Trexler, Bushnell & Wolters, Ltd.

[57] ABSTRACT

A prefabricated cement-foam composite board is provided for use as in a built-up roof construction. The board includes an insulating panel of foam plastic resin, preferably polystyrene, and a layer of lightweight concrete bonded thereto. The lightweight concrete preferably includes a lightweight aggregate and is foamed and further includes a latex. A latex adhesive is used to bond the concrete layer to the foam plastic layer. Reinforcing material may be included in the concrete.

7 Claims, 3 Drawing Figures

CEMENT-FOAM COMPOSITE BOARD

BACKGROUND OF THE INVENTION

Roof construction presents many problems. The roof must be waterproof so that rainwater and melting snow and ice cannot enter the building. In most geographic areas insulation of the roof presents further problems. The roof must be insulated to prevent loss of heat in cold weather when the building is heated, and to prevent entrance of heat in hot weather when the building is air conditioned. Waterproofing and insulation of roofs introduce another problem in that moisture from within the building must no be allowed to condense on the undersurface of a roof, or within the insulation. In addition, the roof surface must be capable of bearing a certain amount of traffic. This may be a very light amount when traffic is necessary only for repairs, or it may be rather heavy traffic in areas where the roof serves as a passageway for access to facilities that must be serviced frequently. In many areas the roof must also be proof against penetration by icicles that may drop from a very substantial height, such as from taller nearby buildings, or from towers above the roof.

Various efforts have been made to solve the above and other problems in roof construction. It is common practice to provide a waterproof membrane on top of a roof deck, which membrane may be a single layer of plastic resin or elastomeric material. or which may be built-up of a plurality of layers of suitable fabric or paper combined with asphalt or bitumen. Suitable insulating material is then placed below the roofing deck and a waterproof membrane or the like is placed beneath the insulation to prevent water vapor in the building from penetrating the insulation.

Alternatively, there is a known built-up roof construction in which a waterproof membrane is placed directly on or above the roof deck to prevent moisture from passing in either direction. Panels of rigid foam insulation then are applied above the membrane. Protection may be provided for the plastic material such as by separate concrete slabs or panels, by roofing gravel, or by a continuous layer of concrete poured on the site.

OBJECTS AND SUMMARY OF THE PRESENT INVENTION

It is an object of the present invention to provide a cement-foam composite board or panel to be laid over a roofing deck and intended to have a waterproofing membrane applied above it.

More particularly, it is an object of the present invention to provide a bonded panel of insulating foam plastic resin material and a lightweight concrete surface.

In carrying out the foregoing and other objects of the present invention there is provided a laminated panel comprising a layer of STYROFOAM or other thermoplastic foam insulation material. The plastic foam is overlaid with the lightweight concrete surface bonded to the plastic foam. The concrete surface is made from a lightweight aggregate such as expanded shale or volcanic rock plus a suitable cement foaming agent, plus a latex for moisture stability and for adhesion to the plastic foam. The lightweight concrete material is itself waterproof through the use of portland cement and protects the foam plastic. It also has a certain degree of insulation which protects the foam from extreme heat. It provides physical protection for traffic support and for protecting against penetration such as falling icicles.

THE DRAWINGS

The invention will best be understood from the following specification when taken in connection with the accompanying drawings, wherein.

DETAILED DISCLOSURE OF THE ILLUSTRATED EMBODIMENT

Figure 1:
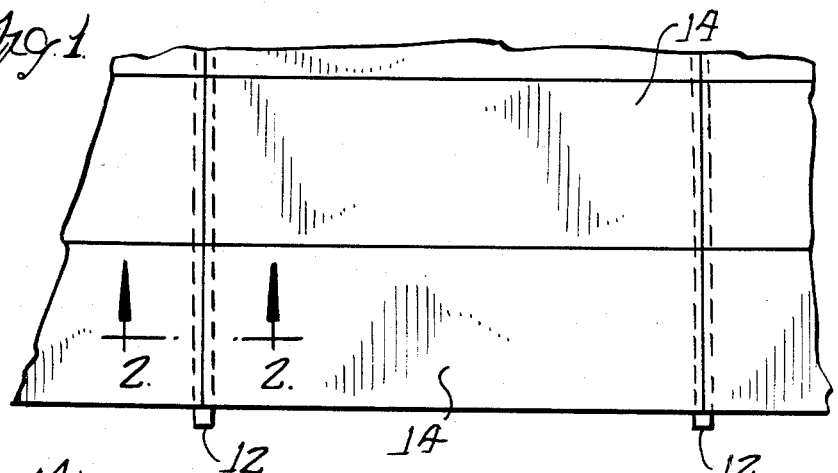
FIG. 1 is a fragmentary top view of a roof constructed in accordance with the principles of the present invention.

Referring now in greater particularity to the drawings there will be seen a roof deck 10 which may be of steel, wood, or other suitable construction, having beams 12 suporting the deck at appropriate locations. Resting on top of the deck is a plurality of composite board panels 14 constructed in accordance with the present invention. The composite panels 14 are preformed, and each includes a base of closed cell expanded foam plastic resin material 16, "STYROFOAM" extruded polystyrene foam plastic sold by the Dow Chemical Company, being a preferred example. The foam plastic is in the form of a slab, and the upper surface thereof is coated with a latex adhesive 18.

The plastic foam slab 16 is provided with an upper layer 20 of lightweight concrete. The concrete layer is made from Portland cement and a lightweight aggregate such as expanded shale or volcanic rock plus a suitable cement foaming agent. A latex also is included for moisture stability and for improving adherence of the concrete layer to the foam slab. Preferably during curing of the concrete a surfacing and separator material such as an Azdel sheet, a glass fiber reinforced polypropylene sheet manufactured by PPG Industries, is used to produce a smooth, hard surface. The lightweight concrete is flame retardant, it provides a measure of insulation which prevents the plastic foam from being damaged by undue solar heat, or the application of heated asphalt of a hot bitumin membrane or torching on of a modified bitumin roof membrane, and it provide protection against physical damage and penetration of the foam by falling articles such as icicles. The lightweight concrete layer is dimensionally stable and is very tolerant of temperature variations in application of hot asphalt or in torching on of a modified bitumin membrane.

As a preferred example, the foam insulation slab 16 comprises "STYROFOAM" polystyrene foam, and the latex coating comprises Dow styrene butidiene latex. The concrete layer comprises by way of preferred example one cubic foot of Type III Portland cement, four cubic feet of expanded shale, and twenty pounds of Dow latex 460 wet at 50%. The lightweight concrete further is preferably reinforced with either random fibers or a fiber mesh. The randon fibers or fiber mesh can be glass fibers, or organic fibers such as polypropylene fibers.

Suitable dimensions for the composite board panel may vary quite considerably, and widths may run from one to three feet, while length may run from six to twelve feet. The thickness is determined by the insulation value desired, and can be from one inch to many inches. The longitudinal and lateral dimensions of the concrete layer of the panel are of course the same as for the foam slab. The thickness again depends on intended usage and may run from a fraction of an inch to two or more inches. The area that will be covered by the specific formulation mentioned depends of course on the thickness of the concrete layer.

The specific latexes noted will be understood as being for example only, and many styrene butidiene or acrylic latexes would be satisfactory. There are many commercially available concrete foaming agents available, and substantially any should suffice. One specific example is "Elastizell" Roof Topping Mixture for Lightweight Concrete, sold by Elastizell Corporation of America, Ann Arbor, Mich.

The use of Portland cement to produce the concrete is preferred as it will provide good moisture resistance, particularly with incorporated latex. The latex-Portland cement combination along with the foam polystyrene plastic resin material provides the best moisture resistance.

The composite structure heretofore described is particularly desirable beneath a roof membrane. The composite board panels provide a high R value as a surface for attaching the membrane, and the concrete surface is particularly compatible with asphalt or modified bitumins which may be utilized in a built-up membrane. The concrete further is resistant to adhesive or solvent attack, and provides a non-melting surface. Incorporation of latex in the concrete improves its moisture resistance, as heretofore noted, and further improves the stability during freeze-thaw conditions. It also enhances the bond between the insulating plastic foam and the concrete.

Figure 2:
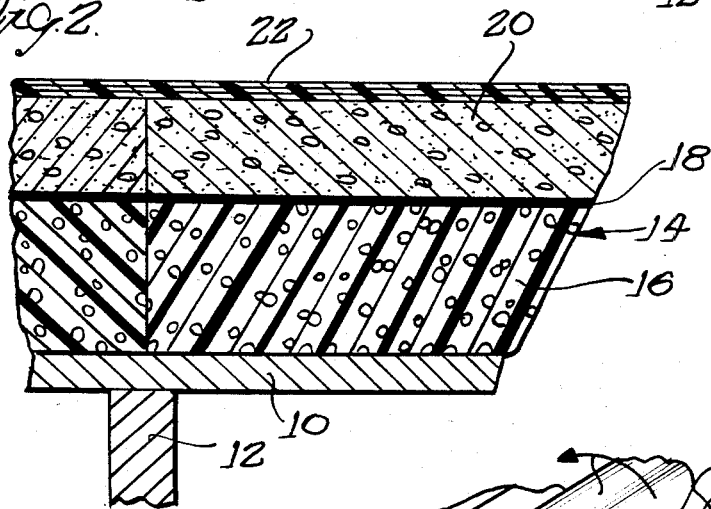
FIG. 2 is an enlarged sectional view through the roof construction of FIG. 1 along the line 2—2.
Figure 3:
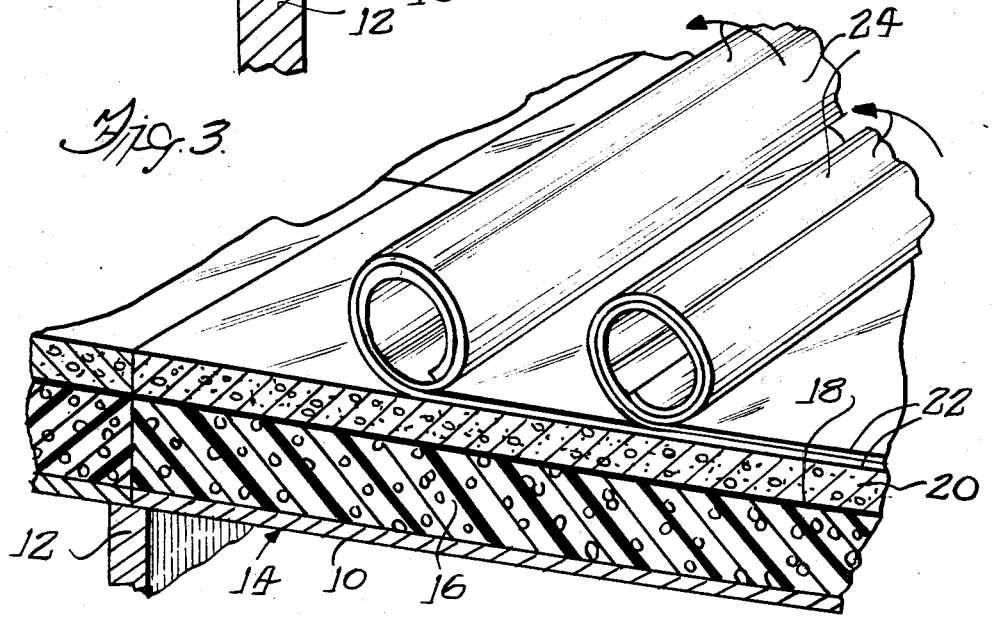
FIG. 3 is a perspective fragmentary view similar to FIG. 2 and showing application of the waterproof membrane.

As will be seen in FIGS. 2 and 3 the composite board panels are topped by a waterproof membrane 22. This waterproof membrane may be a composite membrane made up of suitable paper or fabric supplied as rolls 24, and unrolled in place along with the application of asphalt or bitumin to provide the built-up membrane 22. Since the concrete is dimensionally stable, it provides a particularly good adhesive base for adhering the roof membrane. The foamed lightweight concrete layer provides some insulation, as previously noted, and also provides a desirable heat sink property. The insulation value of the concrete prevents the plastic foam from reaching its thermal distortion temperature. Because both lightweight aggregate and foamed concrete are used the product is lightweight. The use of the concrete under the membrane protects the concrete from erosion and major problems with rewetting. The use of an azdel mold provides very smooth sides and top surfaces for the concrete. A built-up insulated roof using the composite board panels of the present invention is moisture and temperature resistant, is quite resistant to falling objects, and will bear a substantial amount of traffic.

The specific example of the invention as herein shown and described is for illustrative purposes only. Various changes in structure will no doubt occur to those skilled in the art and will be understood as forming a part of the invention insofar as they fall within the spirit and scope of the appended claims.

The invention is claimed as follows:

1. A prefabricated cement-foam composite board comprising an insulating panel of closed cell foam plastic resin, and a layer of lightweight concrete bonded thereto, said concrete being foamed and including Portland cement and a lightweight aggregate.

2. A board as set forth in claim 1 wherein the concrete further includes a latex.

3. A board as set forth in claim 2 and further including a latex adhesive between said foam panel and said concrete layer.

4. A board as set forth in claim 1 and further including reinforcing means in said concrete.

5. A built-up roof construction including a roof deck, a plurality of prefabricated cement foam composite boards supported above said deck and each comprising an insulating panel of closed cell foam plastic resin and a layer of lightweight concrete bonded thereto, said concrete being foamed and including Portland cement and a lightweight aggregate, and a waterproof membrane above said concrete.

6. A roof construction as set forth in claim 5 wherein said waterproof membrane is bonded to said concrete layer.

7. A roof construction as set forth in claim 5 wherein said concrete includes a latex, and further including a latex adhesive between said foam panel and said concrete layer.

* * * * *